US008428580B1

(12) United States Patent
Mitchell et al.

(10) Patent No.: US 8,428,580 B1
(45) Date of Patent: Apr. 23, 2013

(54) AVIATION CELLULAR COMMUNICATIONS SYSTEM AND METHOD

(75) Inventors: James P. Mitchell, Cedar Rapids, IA (US); Scott J. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 280 days.

(21) Appl. No.: 12/827,632

(22) Filed: Jun. 30, 2010

(51) Int. Cl.
*H04B 7/185* (2006.01)
*H04B 7/14* (2006.01)
*H04B 1/16* (2006.01)
*H04B 7/00* (2006.01)
*H04W 4/00* (2009.01)

(52) U.S. Cl.
USPC ............ 455/431; 455/13.4; 455/16; 455/341; 455/522

(58) Field of Classification Search .................. 455/12.1, 455/13.3, 13.4, 19, 127.1–127.3, 193.1–193.2, 455/194.2, 341, 418, 420, 427–431, 434, 455/456.1–456.3, 456.5–456.6, 457, 517, 455/520, 522–524, 550.1, 552.1, 556.2, 557, 455/560–561, 11.1, 15–16, 25; 330/254, 330/278
See application file for complete search history.

(56) References Cited

U.S. PATENT DOCUMENTS

| | | | | |
|---|---|---|---|---|
| 5,204,970 A | * | 4/1993 | Stengel et al. ................ | 455/69 |
| 5,220,678 A | * | 6/1993 | Feei ............................... | 455/69 |
| 5,511,233 A | * | 4/1996 | Otten ............................ | 455/524 |
| 5,736,959 A | * | 4/1998 | Patterson et al. ............ | 342/354 |
| 6,108,561 A | * | 8/2000 | Mallinckrodt ................ | 455/522 |
| 6,132,306 A | * | 10/2000 | Trompower .................. | 455/11.1 |
| 6,492,586 B2 | * | 12/2002 | Mikami et al. ............... | 136/292 |
| 6,529,706 B1 | | 3/2003 | Mitchell | |
| 6,614,126 B1 | | 9/2003 | Mitchell | |
| 6,741,841 B1 | | 5/2004 | Mitchell | |
| 7,187,927 B1 | | 3/2007 | Mitchell | |
| 7,245,880 B1 | * | 7/2007 | Jacobsen ....................... | 455/69 |
| 7,260,413 B2 | * | 8/2007 | Gersemsky et al. ........ | 455/507 |
| 7,280,498 B1 | | 10/2007 | Mitchell | |
| 7,343,157 B1 | | 3/2008 | Mitchell | |
| 7,483,696 B1 | | 1/2009 | Mitchell | |
| 7,496,361 B1 | | 2/2009 | Mitchell et al. | |
| 7,599,691 B1 | | 10/2009 | Mitchell | |
| 7,761,793 B1 | | 7/2010 | Mitchell | |
| 7,865,132 B2 | | 1/2011 | Mitchell | |
| 2002/0098860 A1 | * | 7/2002 | Pecen et al. .................. | 455/522 |
| 2004/0203989 A1 | * | 10/2004 | Karaoguz ..................... | 455/522 |
| 2006/0058061 A1 | * | 3/2006 | Nakagawa et al. ......... | 455/553.1 |
| 2006/0238257 A1 | * | 10/2006 | Han .............................. | 330/289 |
| 2007/0168675 A1 | * | 7/2007 | Wahlberg et al. ............ | 713/182 |

* cited by examiner

*Primary Examiner* — Meless Zewdu
(74) *Attorney, Agent, or Firm* — Donna P. Suchy; Daniel M. Barbieri (57) ABSTRACT

Disclosed are a system and method for controlling transmit power of a mobile node in air-to-ground communications to a fixed node. Power is controlled by taking into consideration the position of the mobile node, the ground position of a plurality of fixed nodes, and the RF pattern of an antenna. Preferably, a power level is selected that will excite the fewest number of the plurality of fixed nodes while still maintaining a stable connection with at least one of the fixed nodes. The system may also utilize a repeater to receive communication signals from one or more mobile phones. This repeater then pre-amplifies the signal with a gain control signal received from one of the plurality of fixed nodes. The repeater would then pass the pre-amplified signal to the power amplifier for further amplification as controlled by the power controller.

17 Claims, 9 Drawing Sheets

AVIATION CELLULAR COMMUNICATIONS SYSTEM AND METHOD

BACKGROUND

Mobile phone use has become increasingly popular and ubiquitous. Rather than simple communications devices, mobile phones have become portable computers that integrate calendar, email, contact, and other applications. Consequently, the use of other communication devices that don't have these integrated and personalized features has become undesirable. Unfortunately, certain situations force the use of other communications devices. One example of such a situation is air travel. Conventional mobile phones are very undependable during flight as they do not transmit at a high enough power to maintain communication with the ground networks. Current aircraft communication systems are undesirable because they are both expensive and duplicate the mobile phone equipment people already have and would prefer to use.

Current aircraft communication systems utilize satellite communication systems or other alternatives to traditional ground-based mobile phone networks. Aircraft communications concepts pose issues with ground networks because of the possibility of illuminating many base station towers in the same band. This issue resolves itself within the network by only using one coded signal, however, illumination of multiple base stations may use bandwidth resources preventing others from locking on to the base station. In addition, illuminating multiple base stations may raise the noise floor to the point that another mobile phone user on the ground loses link because of the added marginal noise. Current terrestrial based network solutions also rely upon network infrastructure investment. Therein lies the need for a low-cost terrestrial based air-to-ground system that does not require investment in new infrastructure while scaling with commercial network technology advancements.

SUMMARY

In view of the foregoing, this disclosure teaches a system and method for controlling transmit power of a mobile node (e.g., a mobile phone) in air-to-ground communications to a fixed node (e.g., a base station tower). Power is controlled by taking into consideration the position of the mobile node, the ground position of a plurality of fixed nodes, and the RF pattern of an antenna. Preferably, a power level is selected that will excite the fewest number of the plurality of fixed nodes while still maintaining a stable connection with at least one of the fixed nodes. In this way, conventional mobile nodes may be used in an aircraft setting while limiting the bandwidth stress on the fixed nodes.

According to one embodiment, a system for controlling transmit power of a mobile node in air-to-ground communications to a fixed node is provided. The system includes a first position determination unit configured to determine a position of the mobile node, a second position determination unit configured to determine ground position information for a plurality of fixed nodes, a power amplifier configured to amplify the power of a communications signal, and an antenna coupled to the power amplifier, the antenna being configured to produce an RF pattern when energized by the power amplifier. The system further includes a power controller coupled to the power amplifier, the power controller configured to control a power level of the power amplifier, wherein power controller is configured to determine the power level according to the position of the mobile node, the ground position information of the plurality of fixed nodes, and the RF pattern.

Additionally, the system may also utilize a repeater to receive communication signals from one or more mobile phones. This repeater then pre-amplifies the signal with a gain control signal received from one of the plurality of fixed nodes. The repeater would then pass the pre-amplified signal to the power amplifier for further amplification as controlled by the power controller.

According to another preferred embodiment, the power controller is further configured to determine the power level that will cause the RF pattern to excite the fewest number of the plurality of fixed nodes while still maintaining a stable connection with at least one of the plurality of fixed nodes.

According to another embodiment, a method for controlling transmit power of a mobile node in air-to-ground communications to a fixed node is described. The mobile node includes an antenna coupled to a power amplifier, the antenna being configured to produce an RF pattern when energized by the power amplifier. The method includes the steps of determining a position of the mobile node, determining ground position information for a plurality of fixed nodes, and calculating a power level of the power amplifier utilizing the position of the mobile node, the ground position information of the plurality of fixed nodes, and the RF pattern.

DETAILED DESCRIPTION

Figure 1:
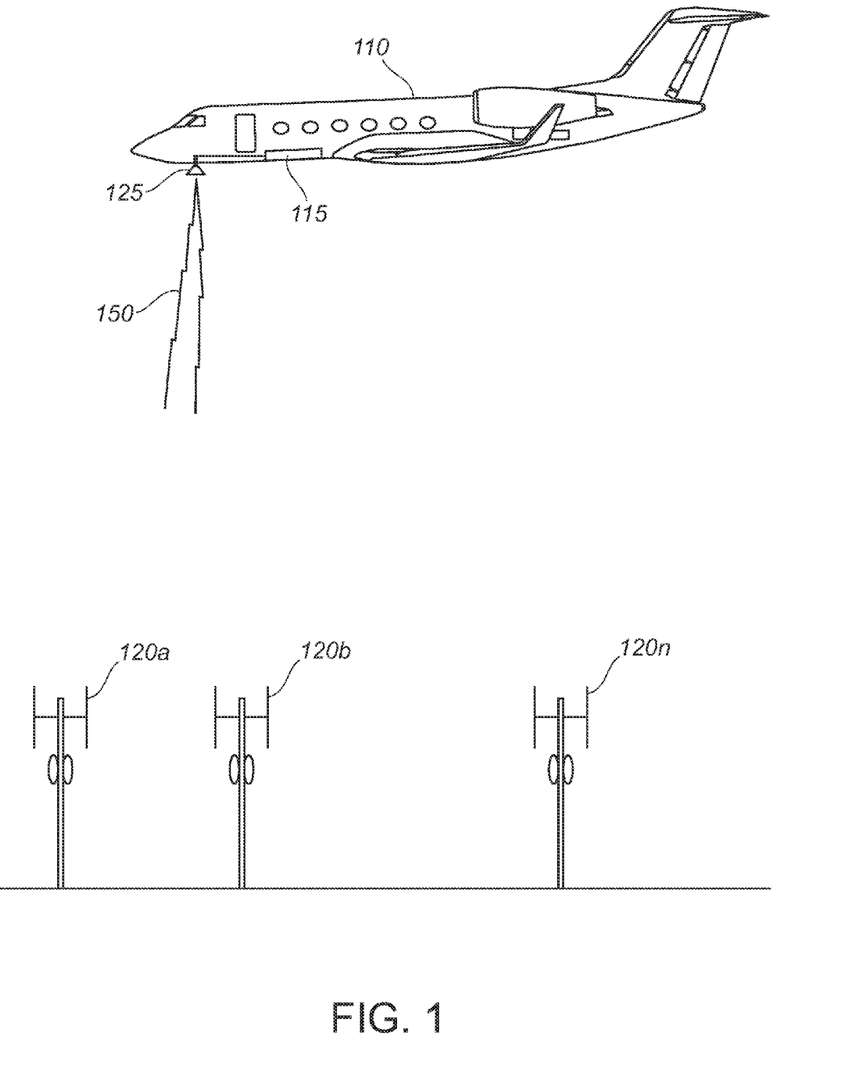
FIG. 1 shows an operating environment for one aspect of the disclosed system.

FIG. 1 shows an operating environment for one aspect of the disclosed system. A vehicle 110 includes a mobile node 115 that broadcasts or delivers communications signal 150 through antenna 125 to a plurality of fixed nodes 120a-n. Mobile node 115 may be any type of communication device or system that is operational in a moving environment. As one example, mobile node 115 may be a mobile phone system operating any of the conventional communications standards, including CDMA, CDMA2000, GSM, UMTS, W-CDMA, PCS, LTE (long term evolution), etc. As another example, mobile node 115 may be a data communications system such as WiFi, WiMax, HSDPA, etc. Fixed nodes 120a-n are fixed-location transceivers configured for the communication standard used by mobile node 115. In the case that mobile node 115 is a mobile phone system, fixed nodes 120a-n would be mobile phone base stations mounted on towers or buildings.

Vehicle 110 is preferably an airplane, but the disclosed system may be applicable for use with any type of aircraft, including helicopters, blimps, balloons, etc.

One aspect of the disclosed system is controlling transmit power of mobile node 115 in air-to-ground communications to fixed nodes 120a-n. Power is controlled by taking into consideration the position of mobile node 115, the ground position of fixed nodes 120a-n, and the RF pattern produced by antenna 115. Preferably, a power level is selected or controlled to guarantee the excitation of the fewest number of fixed nodes 120a-n while still maintaining a stable connection with at least one fixed nodes 120a-n. In this way, mobile nodes 115 may be used in a way that limits the bandwidth stress on fixed nodes 120a-n.

Figure 2:
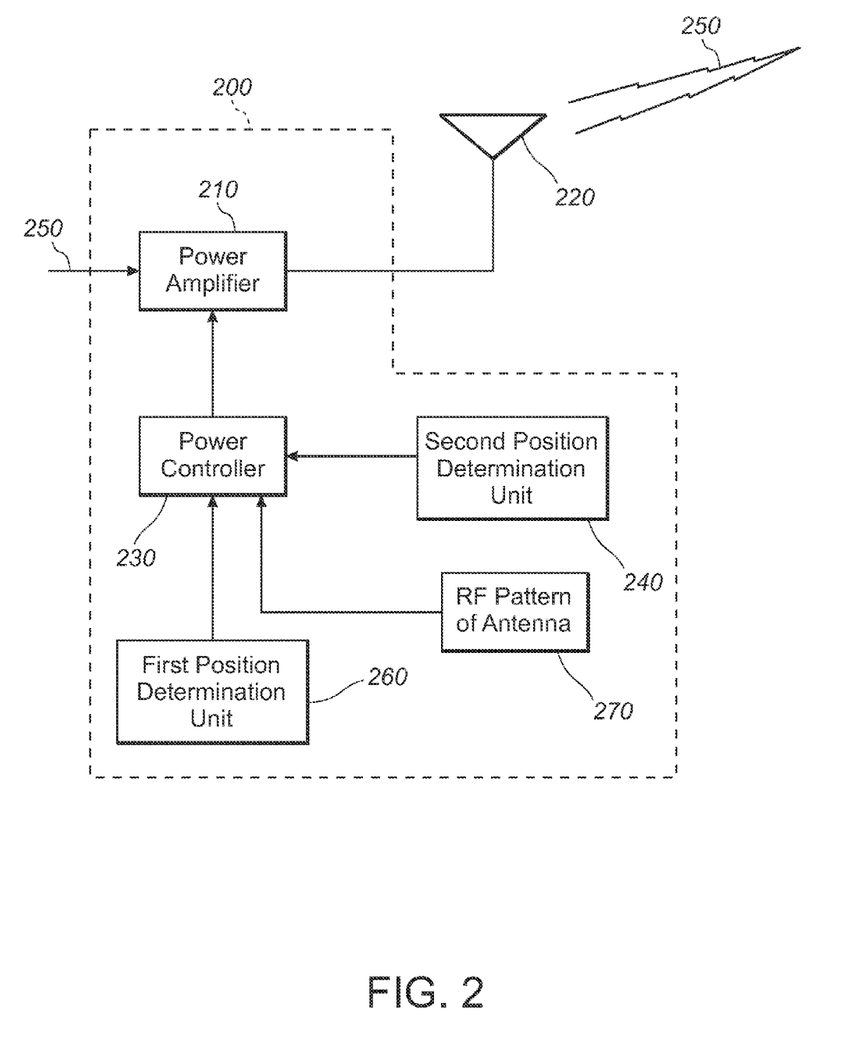
FIG. 2 shows a block diagram for one embodiment of the disclosed system.

FIG. 2 shows a block diagram for one embodiment of the disclosed system. Power controlling system 200 includes at least a power amplifier 210, a power controller 230, a first position determination unit 260, a second position determination unit 240, and a memory 270 which stores information concerning the RF pattern of antenna 220. Power amplifier 210 receives communications signal 250 and amplifies the signal to the desired power level.

Power amplifier 210 may be any conventional amplifier configured to produce an adjustable level of gain upon a radio frequency communications signal. Preferably, power amplifier is configured to provide a gain of up to at least 35 watts. Such a level of amplification would support a 100 mile range for a 700 MHz signal assuming 16 QAM modulation. Once amplified, communications signal 250 is broadcast through antenna 220 as amplified communications signal 250'.

Power controller 230 is configured to control the power level produced by power amplifier 240. Any power controller described in this disclosure may be implemented as a general purpose computer executing software, an application specific integrated circuit (ASIC) executing software or firmware, or any other device or technique for effecting electronic control of a power amplifier. Power controller 230 may take several data points into consideration into when selecting the power level. One data point is the current position of the mobile (i.e., the vehicle on which the mobile node is contained). First position determination unit 260 provides the position of the mobile node. First position determination unit 260 may include a global positioning unit (GPS), an inertial navigation system (INS), and an altimeter to provide information latitude/longitude, heading, and altitude information concerning the mobile node. Alternatively, first position determination unit 260 may consist of a database containing the known locations of various types of transmitters. For example, these transmitters may be TV towers, radio broadcasting towers, mobile phone base stations etc. An additional antenna or antennas (not shown) may be coupled with the first position determination unit to detect signals broadcast from such known transmitters. When signals from these transmitters are received, the location of the mobile node may be determined by consulting the database of known locations and calculating the distance given the presence and strength of that signal.

An additional data point comes from second position determination unit 240 which provides ground position information for a plurality of fixed nodes. Second position determination unit 240 may be implemented as a database. At a minimum, by knowing the current position of the mobile node and the ground position of the fixed nodes, a decision on what power level is needed to broadcast to a fixed node can be determined. The RF pattern (e.g., 3 dB point, 5 dB point or other contour level used to compute a suitable link budget of a combined aircraft transmit/receive antenna or split transmit/receive antenna) of antenna 220 may also be stored in memory 270 to provide yet another data point to power controller 230. By knowing the RF pattern produced by antenna 220, a more accurate determination of how much power is needed given the shape of the beam (i.e., the RF pattern) to communicate with the fixed ground node.

Preferably, a power level is selected by power controller 230 that will excite the fewest number of fixed nodes while still maintaining a stable connection with at least one fixed nodes. A more detailed discussion of how power level is selected by a coarse inner control loop (aircraft position) 421 and further regulated by a fine outer control loop (base station) 481 is made in the discussion of FIG. 4.

Figure 3:
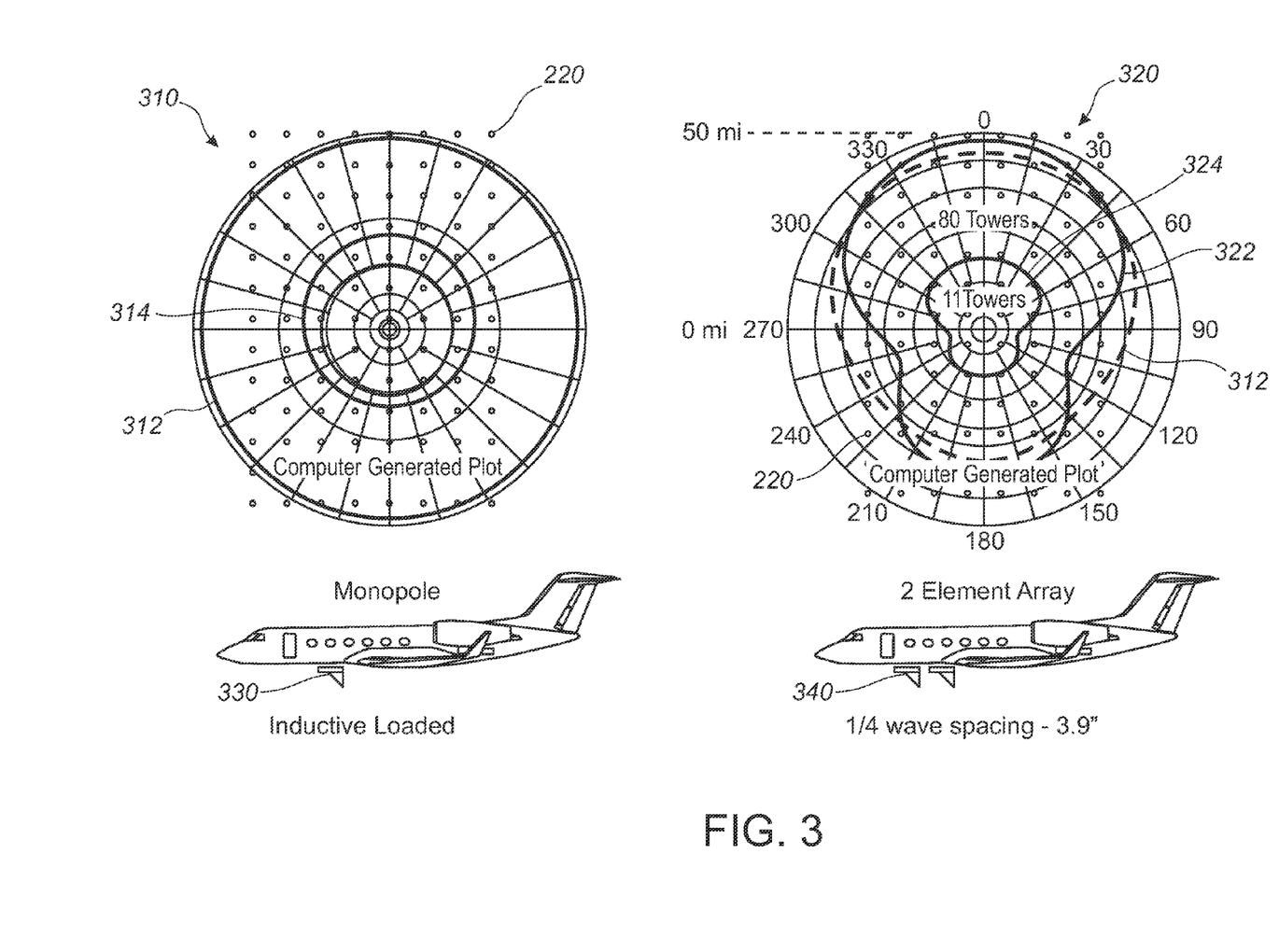
FIG. 3 shows example RF patterns applicable for use with the disclosed system.

FIG. 3 shows example RF patterns applicable for use with the disclosed system. Plot 310 shows example RF patterns for an inductively loaded monopole antenna 330. As can be seen, the example patterns have generally uniform circular ground coverage. Monopole pattern 312 simulates the pattern at full amplification while monopole pattern 314 simulates the pattern at a reduced amplification. As can be seen, controlled monopole pattern 314 illuminates fewer fixed nodes 220 than the monopole pattern 312.

Plot 320 shows example RF patterns for both an inductively loaded monopole antenna 330 and a quarter wave spaced phased array antenna 340. Phased array patterns 322 and 324 differ from the pattern 312 of a monopole antenna in that the RF pattern produced is generally directional (i.e., not uniform). In the example shown in plot 320, the coverage of phased array pattern 322 and 324 are larger to one side and attenuated on the opposite side. This may be preferable in aircraft applications as the mobile node is likely to be moving at a high rate of speed. In such a case, communicative contact can be maintained with a fixed node that is out ahead of the path of the aircraft. As such, it is more important to maintain a sustained contact with fixed nodes in front of the aircraft than behind it. As such, phased array antenna 340 can be mounted on the aircraft such that the larger lobe of the RF pattern is projected to the front of the aircraft and the smaller lobe or null can be projected to the back.

As shown in plot 320, phased array pattern 322 illuminates fewer ground nodes behind the antenna than does monopole pattern 312. Also, plot 320 shows an example of a how power level can affect the number of ground nodes illuminated. Phased array pattern 322 (at full power) illuminates 80 towers in this example, while phased array pattern 324 (at minimum adequate power) illuminates 11 towers.

Figure 4:
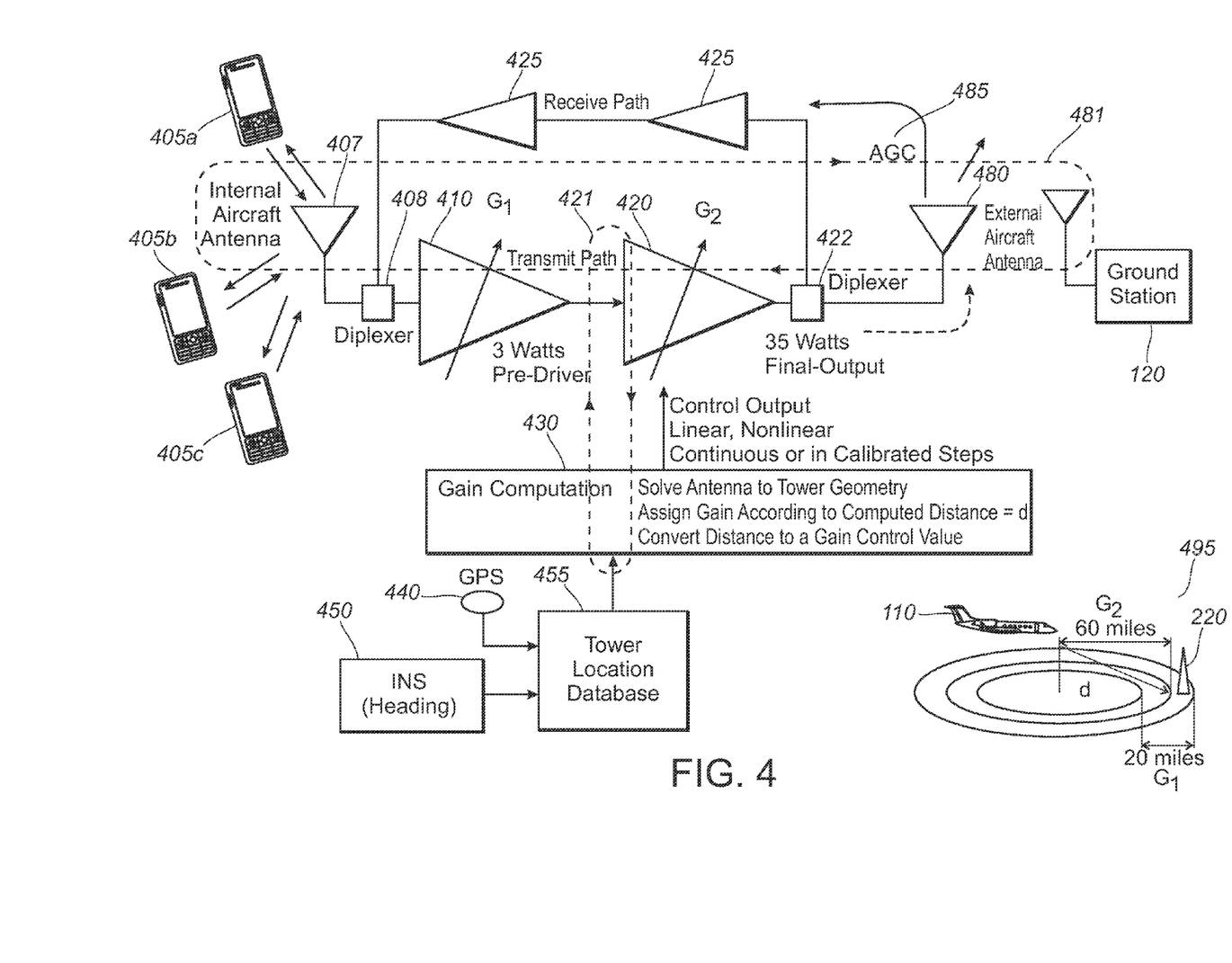
FIG. 4 shows a block diagram for a preferred embodiment of the disclosed system.

FIG. 4 shows a block diagram for a preferred embodiment of the disclosed system. One or more conventional mobile phones 405a-c communicates to system 400 through antenna 407. Mobile phones 405a-c can be any conventional mobile phone, such as a 3G UMTS phone available from a major service provider like AT&T. Antenna 407 is preferably mounted somewhere inside an aircraft.

The signal from mobile phones 405a-c is routed to a pre-amplifier 410 through diplexer 408. Pre-amplifier 410 is preferably a cellular repeater. For example a Wilson Electronics 700, 800, or 1800 MHz Cellular PCS SmartTech amplifier with 50 dB/50 dB of gain. Pre-amplifier 410 pre-amplifies (gain G1) the signal received from the mobile phones, preferably by using an automatic gain control (AGC) signal 485 received from a mobile phone base station (i.e., a fixed node). Preferably, pre-amplifier 410 amplifies the signal by up to 3 watts. The automatic gain control signal is routed to the pre-amplifier 410 through a receive path that may contain one or more amplifiers 425. This receive path also routes any voice communications received from the fixed ground nodes back to mobile phones 405a-c.

Automatic Gain Control (AGC), the total, resulting gain of both loops (421, 481), is accomplished by regulating and maintaining the output power levels of the amplifiers to a level that is maintained to be minimal and nearly constant at a selected base station. A control word is delivered from the base to the aircraft amplifier (and/or user device), effectively providing a negative feedback loop from the RF amplifier's wireless output, via a wireless return control word to the amplifiers input port. Commercial-off-the-Shelf amplifiers and handsets are typically controlled and limited to 0.6 to 3 Watts. While these devices contain power control capability they do not provide the extended range required for direct application to airborne use. Direct-to-ground systems may require as much power as 35 Watts (more or less) and additional gain with additional gain control. This disclosure describes the addition of gain and gain control to handle the additional dynamic range.

Continuing with the discussion of the transmit path, the pre-amplified signal goes to power amplifier 420, which is configured to variably amplify the signal by approximately 45 dBm yielding an output power level of about 35 watts (gain G2). This power amplifier is controlled similarly to the high level system described in FIG. 2. The output from power amplifier 420 is routed through diplexer 422 and broadcast out to fixed ground nodes through antenna 480. In a preferred embodiment, this antenna is mounted externally to an aircraft. The signal from antenna 480 is then broadcast to one or more ground stations 120.

Power controller 430 is responsible for computing the gain (G2) adequate for power amplifier 420 to produce a signal that maintains a stable connection with at least one ground node. Preferably, power controller 430 is implemented through an ASIC, general purpose CPU, or other programmable hardware. As can be seen in plot 495, the initial gain G1 produced by pre-amplifier 410 may only be capable of communications a portion of the distance from fixed node 120 to mobile node 110. Power controller 430 is responsible for calculating the gain G2 that enables a stable connection to cover the remaining distance. Power controller 430 may vary the gain G2 of power amplifier 420 in any fashion, including linear control or non-linear control in continuous or calibrated steps.

RF power level (air-to-ground) is determined or regulated by the cascading amplifier system shown in FIG. 4. The first amplifier/Control system may use existing ground (base station) tower base stations 120 and existing low-cost cellular enabled user devices 405b. The user device(s) provide RF amplification and is controlled by continuous feedback (e.g., AGC) control words via a control channel from the ground tower. Typical power range for a user device ranges 0.6 to 3 Watts (FCC limit). This control loop is depicted as loop 481 in FIG. 4. This level alone however, may not provide sufficient EIRP (Effective. Isotropic Radiated Power) to reach distances required by a proposed air-to-ground system. Therefore, a second amplification system, including power amplifier 420 and power controller 430 cascades the first amplifier to effectively boost total RF power to 45 dBm or an output of approximately 35 Watts to increase effective connectivity range from 5 to 70+ miles. This inner control loop is depicted as loop 421 in FIG. 4. This range may be beneficial from time to time to meet significant distance challenges between towers. Exact power levels depend on a number of factors including modulation, band, quality of service (QOS) and desired data throughput.

Figure 5:
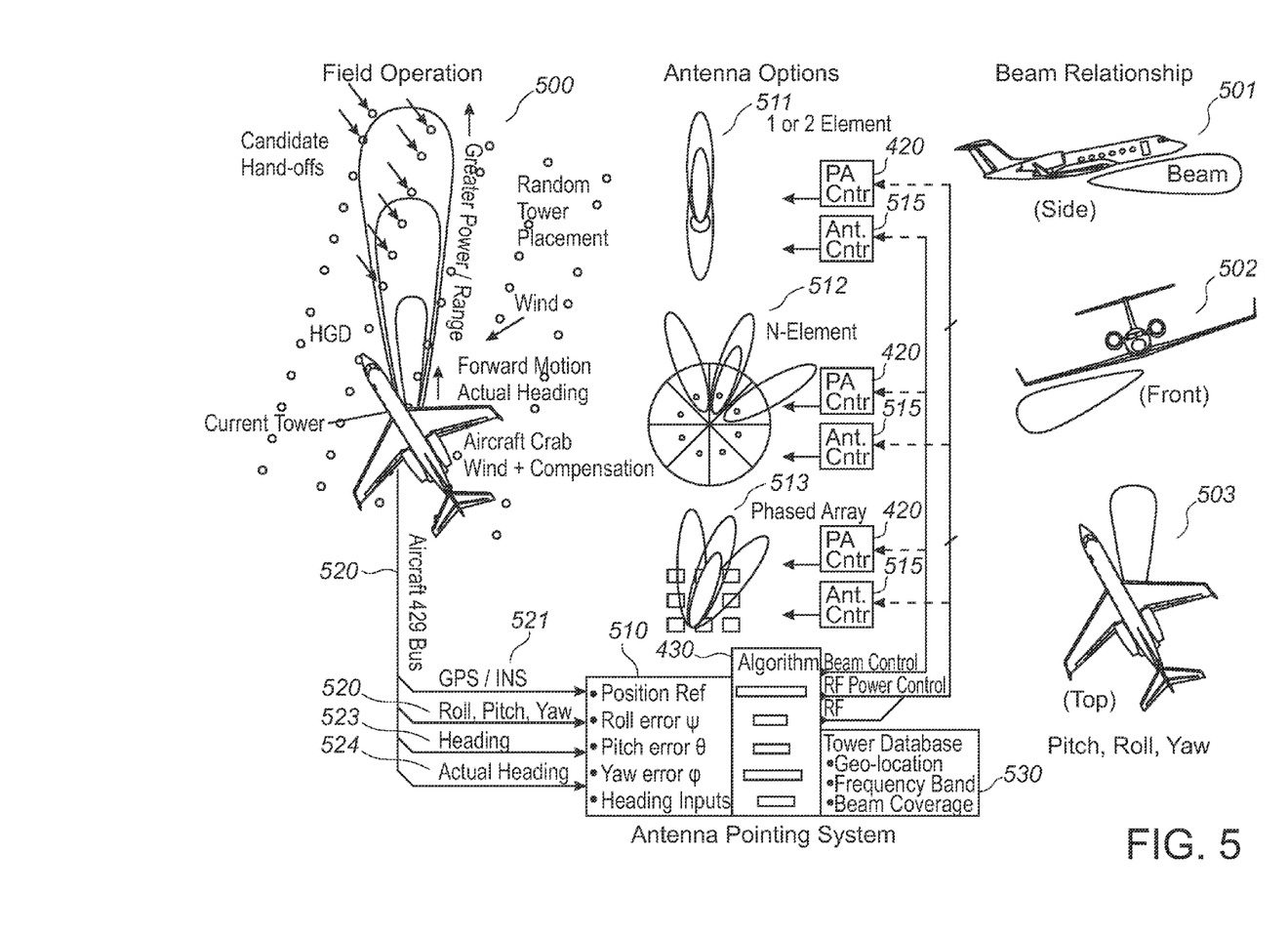
FIG. 5 shows an overhead view of an aircraft relative to fixed ground nodes and examples of directional and steerable antennas.

As the aircraft traverses, each amplifier gain control is set by the respective closed loop. Because the user device (with gain G1) is by design compatible with the ground system (step control feedback technology), the second power amplifier 420 is driven by its gain control inputs (aircraft position information vs tower location) and is designed to place its own power level G2 plus the first amplifier power level G1 into a nominal operating range. As the aircraft moves, the user device may begin to reach its dynamic range limit (or a limit set by FAA, FCC). Control loop 421 (i.e., power controller 430 and power amplifier 420) recognizes this and injects or removes transmit gain to or from the user device 405. Control loop 421 as described herein may continually select computed optimal antenna beam adjustments 513 to achieve any required and available antenna gain first, in place of using additional PA gain or to use both as a solution to arriving at required gain.

In order to add additional power for increased aeronautical distances and maintain power step resolution, additional power amplification accompanied with a second power gain control system is be added (i.e., G2). Power controller 430 is preferably capable of regulating (e.g., in steps) power amplifier 420 from 0 to 35 Watts or levels to provide unity gain, e.g., a first amplifier pass though (0 dBm) to 45.44 dBm.

Figure 6:
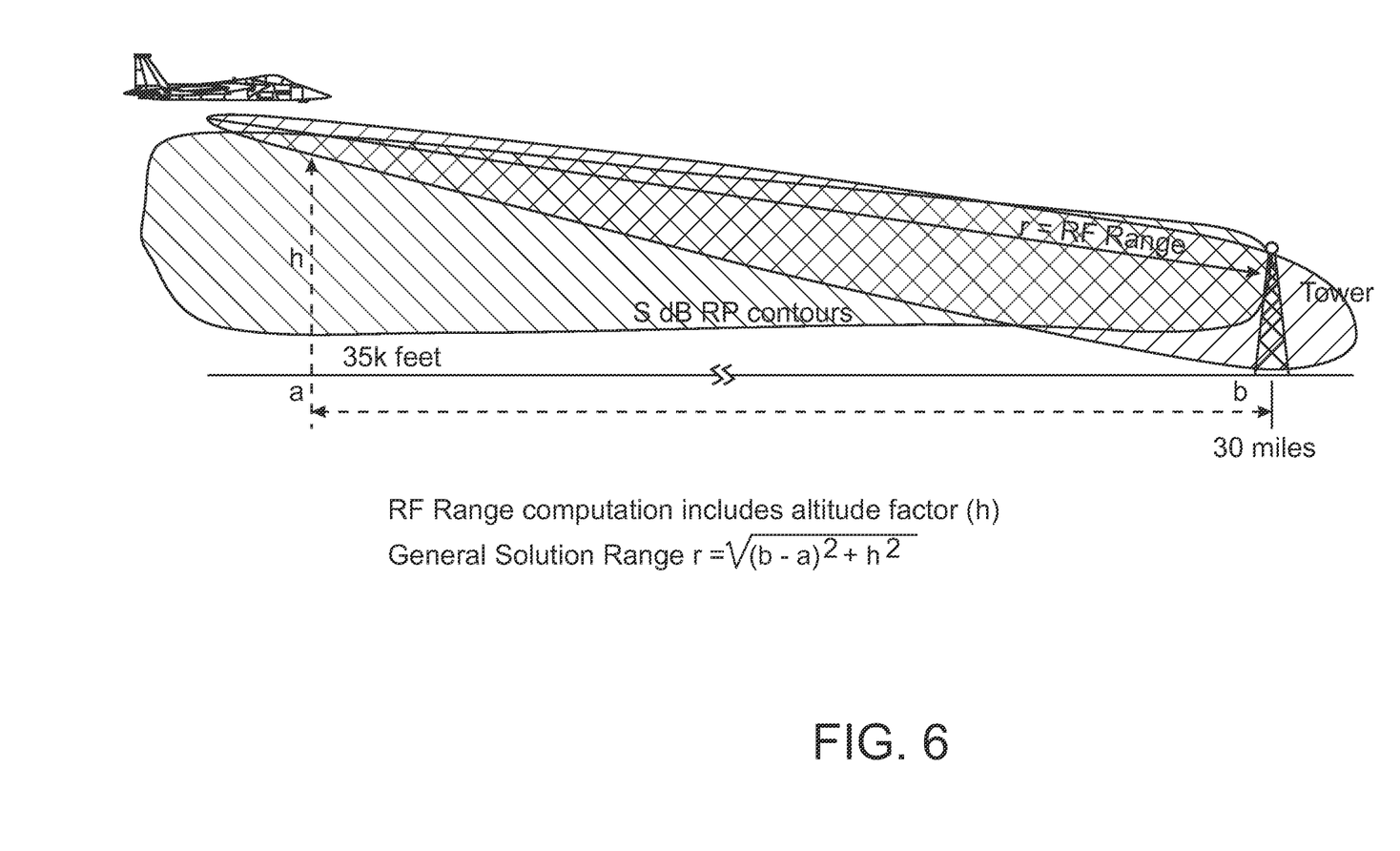
FIG. 6 shows an example of a range estimation from an aircraft to a fixed ground node.

In essence, power controller 430 solves the antenna to tower geometry such that the RF pattern produced by antenna 480 reaches fixed node 120 with an adequate amount of strength such that stable communications may be maintained. The first step is to determine a distance d to the candidate ground node and then next convert that distance to a gain control value G2. In order to compute that distance, the system may utilizes a GPS unit 440 to give the current coordinates of the mobile node 110 to power controller 430. GPS unit 440 may be any type of positioning system capable of providing real-time location information. A fixed node (e.g., cellular tower) database 455 is used to provide physical location information for the fixed nodes. A distance d can be calculated from the information provide by GPS unit 440 and database 455 using the simple geometric calculation shown in FIG. 6. The RF range r to a tower is calculated by squaring the ground distance (b–a) from the mobile node to the tower, adding the squared height of the mobile node h, and then calculating the square root of this sum. This simple equation provides a geometric model or first-order estimation of relative distance between the aircraft and the ground node. This model does not support the added dimension of multipath and other fade models as the link is primarily free-space. Additional modeling may be added to support fade estimation and for engineering advance radios supporting MIMO, SIMO (multiple input multiple output, single input multiple output) type radio and antenna systems for close in terrain regions.

$$r = \sqrt{((b-a)^2 + h^2)} \quad \text{Basic Relative Distance Equation}$$

Returning to FIG. 4, it may be helpful to also utilize an INS unit 450 to provide a heading of the aircraft. Since the distribution of fixed nodes may be uneven on the ground, it is helpful to know the heading of the aircraft so that distances to candidate fixed nodes used in handoffs and future communications may be pre-calculated. In addition, the shape of the RF pattern produced by antenna 480, in combination with the heading of the aircraft, allows power controller 430 to select a fixed node(s) from database 455 that are capable of communicating with the mobile node 110 given its current position and future position given the heading.

FIG. 5 shows an overhead view of an aircraft relative to fixed ground nodes and examples of direction and steerable antennas. In addition, FIG. 5 shows an additional embodiment where roll, pitch, and yaw of the aircraft and further taken into consideration in order to calculate the gain of the power amplifier 430. In this example, GPS/INS information 521, roll/pitch/yaw information 522, heading information 523, and actual heading information 524 are provided to power controller 430 over a bus 520, such as a commonly-used aircraft 429 bus.

As shown in FIG. 5, a pitching aircraft 501 may cause the beam (or RF pattern) produced to also rise or lower relative to the ground. As such, a greater or lesser power level may be selected by power controller 430. Likewise, a rolling aircraft 502 may cause the beam to more or less effectively communicate with fixed nodes to the side of the aircraft. This information may cause the power controller 430 to alter the gain selected based on this information. In addition, the roll information may allow for a closer fixed node to be selected if it is to the side of the aircraft that it is rolling toward. Similar considerations may be made for a yawing aircraft 503. In essence, the pitch/roll/yaw of the aircraft introduces "errors" in how far the RF pattern is presumed to be able to communicate at a certain power level. By calculating these errors, adjustments to the secondary power amplifier level may be made to compensate.

Compute initial aircraft position/attitude use from inertial system/GPS

Compute next incremental aircraft position/attitude using INS and GPS

Compute incremental position difference

Identify aircraft trend (dynamic)

Make changes to tower selection if new link budget requires

Select improved tower position from tower database (if required)

Recompute Antenna Beam Direction, Correct Antenna Beam via control

Recompute RF Power (via extended range power amplifier gain control)

Repeat Process

|  | Initial Position | Incremental | Difference | Antenna Change |
|---|---|---|---|---|
| Roll | $\Phi_1$ | $\Phi_2$ | $\Phi_1 - \Phi_2$ | $f(\Phi_1 - \Phi_2)$ |
| Pitch | $\theta_1$ | $\theta_2$ | $\theta_1 - \theta_2$ | $f(\theta_1 - \theta_2)$ |
| Yaw | $\Psi_1$ | $\Psi_2$ | $\Psi_1 - \Psi_2$ | $f(\Psi_1 - \Psi_2)$ |

Where f( ) generally represents an antenna specific function that depends on the antenna manufacturer control design. The idea is to use aircraft dynamics information to continuously correct the air-to-ground antenna pointing.

The embodiment shown in FIG. 5 includes an enhanced database 530 that contains frequency band and beam coverage information concerning the fixed nodes in addition to their location. Certain fixed nodes may be stronger or weaker than others, so such information may be additionally used to adjust the final power level of power amplifier 420.

Previous examples of antenna patterns shown in FIG. 3 have assumed the use of a fixed uniform or directional antenna beam. For example, 1 or 2 element antenna array 511 shown in FIG. 5. Such an antenna array has the advantage of being relatively cheap and of low complexity. For example, the disclosed system may further include an antenna controller 515 for controlling whether or 1 or 2 elements of antenna array 511 are engaged. For example, it may be preferable to engage both antenna elements so as to create an RF pattern that is substantially null directly underneath the aircraft. In this way, fixed nodes underneath the aircraft, which are unlikely to be candidates for current communication, are not excited by the RF pattern produced by the mobile node. This avoids unnecessarily taxing unused ground nodes.

In addition to omnidirectional and fixed directional antennas, any type of steerable antennas suitable for the desired frequency band may also be used. FIG. 5 shows two examples of steerable antennas: a N-element steerable antenna 512 and a phased array steerable antenna 513. Power controller 430 could be further configured to send a control signal to an antenna controller 515 which controls the RF pattern of the steerable antenna. In this way, if the preferred candidate ground node is to the side of the aircraft, rather than greatly increasing the power level of a fixed directional beam in order to communicate with the node, the beam of a steerable antenna may be aimed directly at the node, thus decreasing the total amount of power needed to maintain stable communications.

A storable aircraft antenna may be a phased array (electrically steered), switched beam (static array) or a mechanically scanned system. All antenna have an RF input/output and a control system for directing the RF beam to a desired direction. The desired antenna direction or vector may be computed by having a priori knowledge of where nearby ground antenna are located and knowing where the aircraft is instantaneously located using a coordinate system (e.g. Cartesian) and computing the direct Line-of-Sight (LoS) path. The predominant control bus for producing aircraft position location and direction is generally the aircraft's avionics ARINC-429 bus (Aeronautical Radio Incorporated). This bus continually delivers aircraft position, direction and attitude information and when used with known ground tower positions is mathematically translated or interfaced into antenna control commands.

Figure 7:
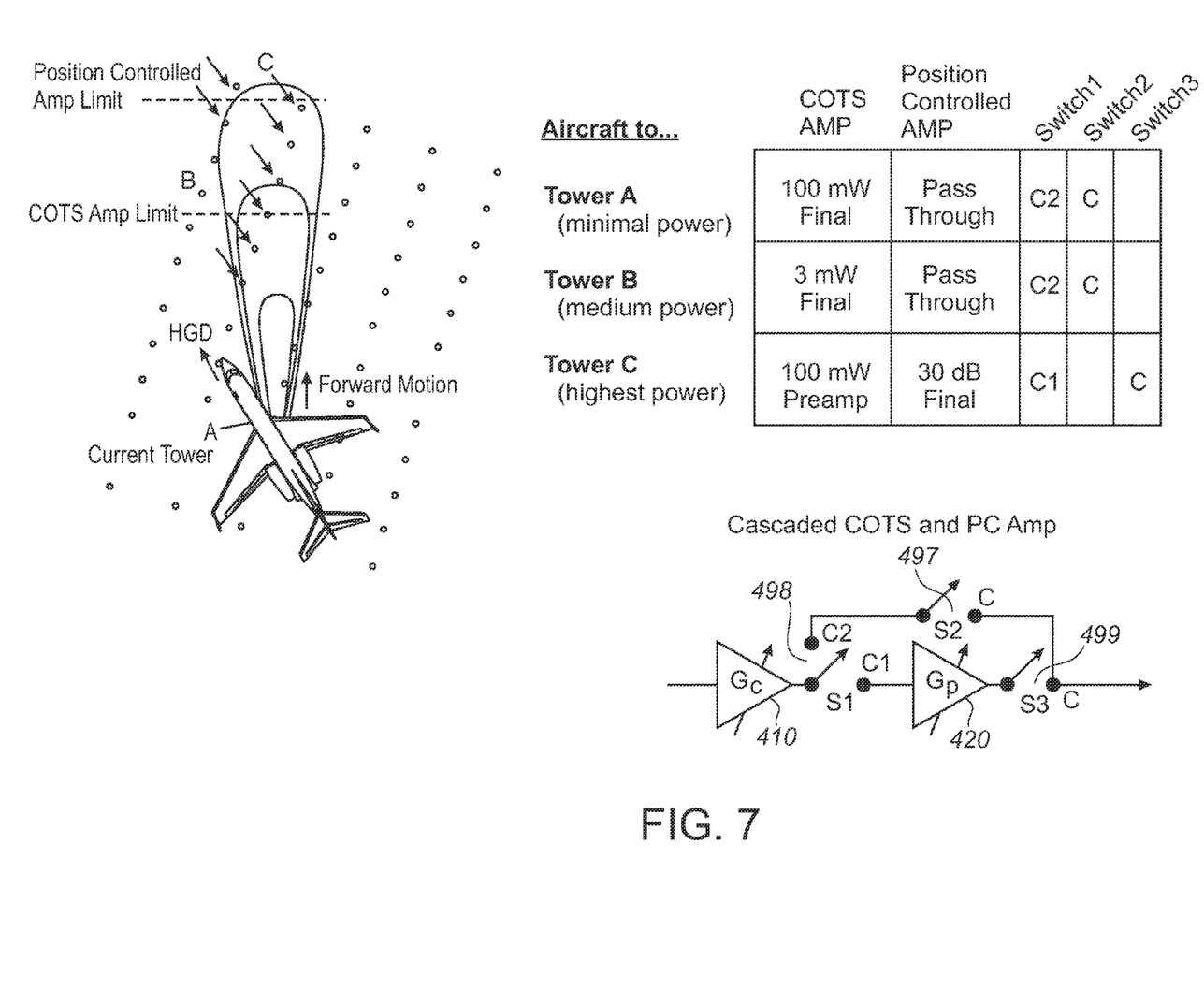
FIG. 7 shows an embodiment of the disclosed system utilizing a switch array for selectable gain stages.

FIG. 7 shows an embodiment of the disclosed system utilizing a switch array for selectable gain stages. In some situations, it may not be necessary to utilize power amplifier 420 to provide enough to communicate with a ground node. For instance, the aircraft may be at a relatively low altitude. In such a case, only the power from the commercial-of-the-shelf (COTS) pre-amplifier 410 would allow for stable communications. In such a case, a switching network consisting of switches 497, 498 and 499 may be controlled (e.g., by power controller 430) to selectively turn off power amplifier 420.

As shown in the table in FIG. 7, if it is determined that only 100 mW of power is necessary for stable connection with fixed node 120A, than the power from pre-amplifier 410 is suitable to produce an RF pattern 710 capable of communicating with fixed node 120A. In that situation, switch 498 is moved to position C2 and power amplifier 420 is bypassed by closing switch 497 and opening switch 499. Since pre-amplifier preferably has a maximum output of 3 watts, 100 mW would be well within its operational parameters. If instead it is determined that it is desirable to begin communication with fixed node 120B (e.g., because you are flying past fixed node 120A), a 3 mW power level is calculated. This is just within the operational parameters of pre-amplifier 410 and will produce RF pattern 730 using the pre-amplifier alone. As such, switch 498 is again moved to position C2 and power amplifier 420 is bypassed by closing switch 497 and opening switch 499. Finally, if instead it is desirable to communicate with fixed node 120C, an RF pattern capable of communicating with that node is not capable using pre-amplifier 410 alone. Additional gain provided by power amplifier 420 is needed to produce RF pattern 740 in order to communicate with fixed node 120c. In this example, 30 dB of gain over the 100 mW pre-amplification is needed. As such, switch 498 is moved to position C1, switch 497 is opened, and switch 499 is closed.

Figure 8:
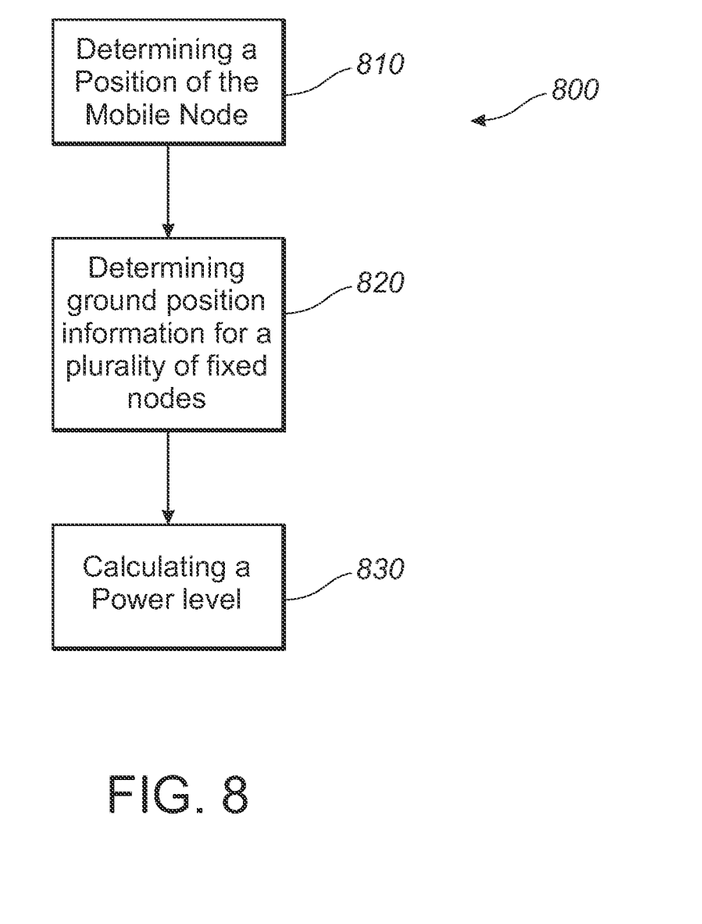
FIG. 8 shows a flowchart of a method according to one embodiment of the disclosure

FIG. 8 shows a flowchart of a method according to one embodiment of the disclosure. This method may be carried out using software, firmware, or purpose built hardware to carry out the following described steps. Such computer or electronic logic implemented method steps may be carried out using any conventional electronic techniques, including any of the aforementioned system components.

In its most basic form, method 800 consists of three steps. Initially, in step 810 the position of the mobile node is determined. Then in step 820, ground position information for a plurality of fixed nodes is determined. Finally, in step 830 a power level for a power amplifier is calculated that allow for communication with one of the fixed nodes given their location information and the location of the mobile. Additionally, step 830 may also take into consideration the RF pattern of the antenna used in the communication to determine an adequate power level.

Figure 9:
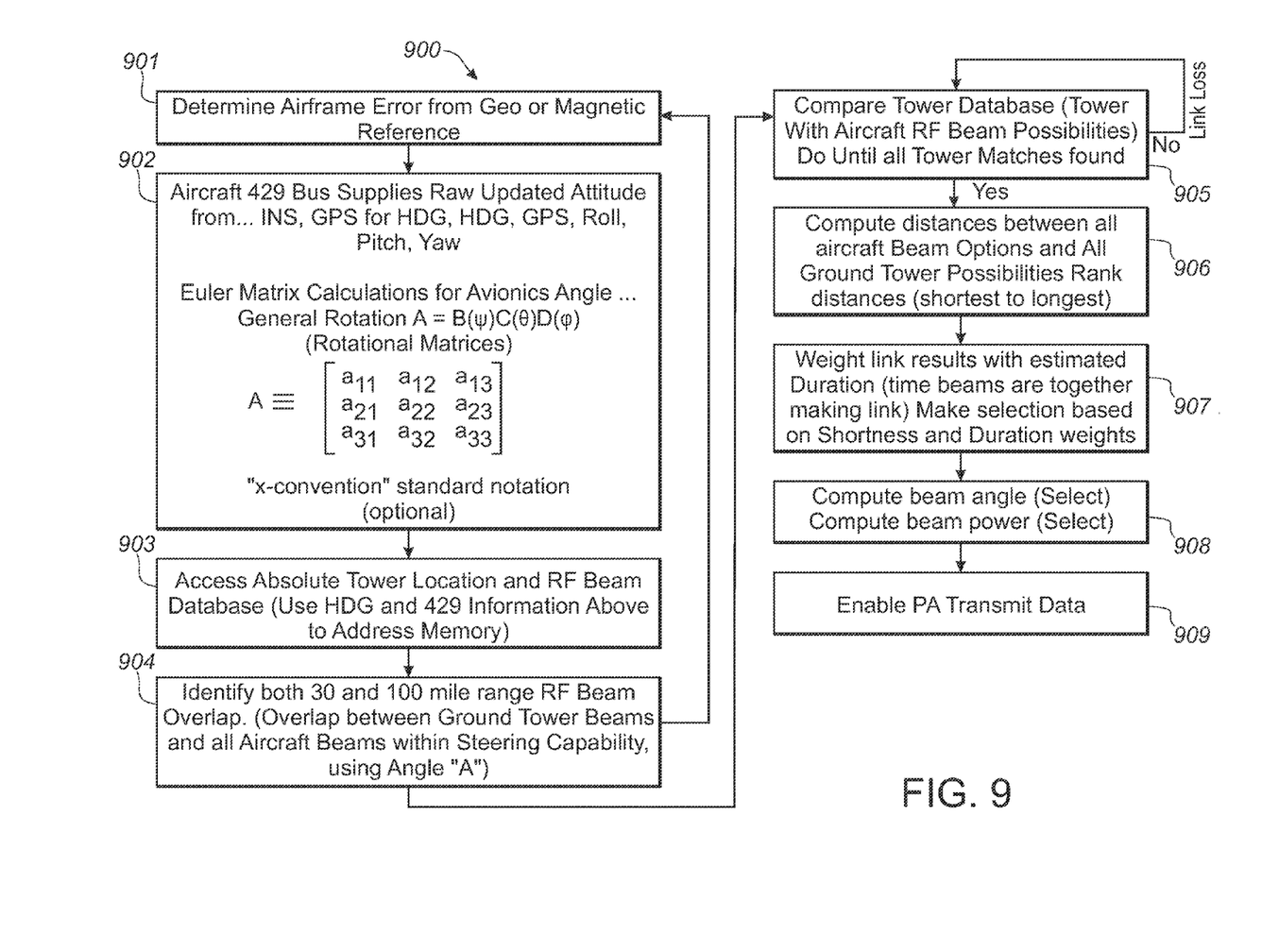
FIG. 9 shows a flowchart of a preferred method according to one embodiment of the disclosure.

FIG. 9 shows a flowchart of a preferred method according to one embodiment of the disclosure. In step 901, the airframe error is determined. This "error" includes the heading of the aircraft from a GPS or INS source, in addition to any pitch/roll/yaw the aircraft is experiencing. Next in step 902, the avionics attitude angle A of the aircraft is calculated using a Euler matrix calculation given the current pitch/roll/yaw of the aircraft. Note that this step is optional for aircraft that do not have equipment that provides pitch/roll/yaw measurement.

Next in step 903, the absolute tower locations of the fixed nodes are accessed from a database. This database may also contain information concerning RF beams and power levels capable by each of the fixed nodes. The portion of this database that is accessed is dependent on the current location and heading of the mobile node (i.e., aircraft). This is to say, you need only need gather location information concerning fixed nodes that you and will be flying over. Information concerning nodes that will not be close enough to be communicated with need not be accessed.

In step 904, the overlap between the RF pattern produced by the mobile node and the RF beam produced by one or more of the fixed nodes is calculated. Such overlap may be extended if the mobile node antenna has steering capability. If a switching network is used between the pre-amplifier and the power amplifier, two different overlap ranges (e.g., 30 and 100 miles) may be calculated in order to determine if the power amplifier is needed. Avionics attitude angle A is used to define the direction and overlap of the antenna beam from the mobile node. Processes 901 through 904 then continuously repeat as the aircraft moves through the sky, updating avionics attitude angles, mobile node location and heading, and candidate tower location and RF beam information.

Next in step 905, overlap angles between the mobile node RF pattern and all candidate towers are compared until a match is found. In step 906, the distances between the mobile node and all matched fixed node are computed and ranked from shortest to longest. In step 907, given the distances calculated in step 906, power levels for each potential link are calculated and estimations are made given their shortness and duration.

One technique for selecting the power levels is as follows. First, assume the set of all ground antenna is "A". Next assume that the radiation envelope from the aircraft antenna "B" represents the minimum EIRP required for closing a bi-directional link with a particular tower or group of towers. Then A∪B, (A union B), is the subset of one or more ground towers within an aircraft's transmit and receive range Due to the advantage (elevation of the aircraft), any of the towers within aircraft LOS (Line of Sight) could potentially and automatically link with the aircraft, however it is the unique advantage of this system that the aircraft adjust it's antenna beam direction/width and power amplifier RF power to purposely reduce or discriminate from undesired tower candidates. The purpose of regulating antenna beam and RF power from the aircraft, is that it reduces same-band interference and harmonic interference to other ground and airborne systems.

It is noted that the automatic power control provided by, a cell tower may not offer sufficient dynamic range to independently control an aircraft PA, as aircraft PA design may reach 35 watts. Towers were designed to control 1 Watt handset more or less, leaving significant dynamic range to be controlled by the airborne system. An extended power control based on unique aircraft variables is presented in this system.

The aircraft system continually selects from a minimal set of ground towers from which to communicate. The aircraft RF power and antenna control system reduces the number of candidate towers by computing link budgets for all (A U B) candidate towers and then based on each tower's estimated link margin, visibility duration, Doppler error, negative illumination of other towers, the computing system performs a cognitive decision or weighting process and then ranks each tower in the order for desirable primary link and one for most desirable hand-off. The top two ranked towers selected, the antenna beam(s) are pointed to best benefit the two selected towers and the antenna pointing and PA are set to deliver only the EIRP required to make the primary and hand-off link(s). For higher order multi-level modulation (QAM-64), power levels are best at high setting, however tower interference may result and in this case QAM-16. Where interference is possible, the lowest order of modulation is may be selected.

Example Variables
Link Margin (LM)
Visibility Duration (VD)
Doppler Error (DE)
Negative Visibility (NV)

In a general example, Figure of Merit (FOM)=(f(LM), f(VD), f(DE), f(NV)). The FOM is determined as a parametric equation with variables. Some of the most important variables are listed, however this list is not meant to be complete or limiting.

Where mission priorities set the functional relationship, e.g., greater "link margin" may become a possibility in urban regions given greater tower density. Greater visibility may be placed in front of other factors in regions such as the desert southwest where few towers are visible. Doppler error may become a priority in business jet aircraft where aircraft may exceed radio Doppler limits. "Negative visibility" may become a priority in high tower density areas.

Most of these factors may be programmed into a database with map and terrain data. As the aircraft traverses across the land priority of each facto may change according to aircraft's position.

A cognitive processor accepts current geo-location factor and compares them with a database. The location factor may be used to select pre-established weights for LM, VD, DE, NV.

Example calculation. Assume FOM=(f(LM), f(VD), f(DE), f(NV))

TABLE 1

| | Tower 1 | Tower 2 | Tower 3 | Tower 4 |
|---|---|---|---|---|
| Link Margin | 10 dB | 20 dB | 15 dB | 25 dB |
| Visibility Duration | 1 min | 5 min | 20 sec | 45 sec |

TABLE 1-continued

|  | Tower 1 | Tower 2 | Tower 3 | Tower 4 |
| --- | --- | --- | --- | --- |
| Doppler Error | 100 ns | 500 ns | 140 ns | 350 ns |
| Negative Visibility | 10 towers | 4 towers | 16 towers | 22 towers |

Assume the following relative importance multiplication factors were found on a group of 4 towers (above) during statistical analysis runs over part the state of Georgia

TABLE 2

|  | Tower 1 | Tower 2 | Tower 3 | Tower 4 |
| --- | --- | --- | --- | --- |
| Link Margin (log) | 0.4 | 0.8 | 0.6 | 1 |
| Visibility Duration | 0.2 | 1 | 0.06 | 0.15 |
| Doppler Error | 0.05 | 1 | 1 | 0.39 |
| Negative Visibility | 0.45 | 0.18 | 0.73 | 1 |
| Pure Sum FOM | 1.1 | 2.9 | 2.3 | 2.5 |
| Rank | 4 | 1 | 3 | 2 |

LM=0.2, VD=0.15, DE=0.05, NV=0.6 Further optimization may be applied to these variables using prior-art optimal control system methods, e.g., Zadeh, Krasovskii, Donald A. Pierre "Optimization Theory with Applications".

TABLE 3

|  | Tower 1 | Tower 2 | Tower 3 | Tower 4 |
| --- | --- | --- | --- | --- |
| Link Margin (log) | 0.08 | 0.16 | 0.12 | 0.2 |
| Visibility Duration | 0.03 | 0.15 | 0.009 | 0.023 |
| Doppler Error | 0.003 | 0.05 | 0.05 | 0.020 |
| Negative Visibility | 0.27 | 0.118 | 0.44 | 0.6 |
| Region Optimized FOM | 0.38 | 0.47 | 1.1 | 0.84 |
| Rank | 4 | 3 | 1 | 2 |

Note the priority of the "negative visibility" variable produces tower #3 as the first choice in directing the antenna beam and power to. The original un-weighted choice in table 2 yielded tower 2 as the first choice.

The main idea is that having these variables drive the selection weighting helps the aircraft system to avoid unnecessary interference with the ground system and network providers. Without this system, use of airborne cell bands may not be accepted. The value of this system is apparent as it enables airborne broadband systems and protects the ground network.

Finally, in step 908 a power level is selected, and if a steerable antenna is used, a RF beam angle is also selected. Then in step 909 the power amplifier is enabled and data is transmitted.

The aforementioned system has been described with the sense that it is a stand-alone communications system and may be used as such. However, this system may also be seen as a component in a larger system that includes satellite communications and other general avionic radio communications. For instance, this system may be used in place of or in addition to the pico cell communication system described in U.S. Pat. No. 7,187,927 entitled "Global Cell Phone System and Method for Aircraft" by James P. Mitchell, et al. and assigned to Rockwell Collins, Inc.

What is claimed is:

1. A system for controlling transmit power of a mobile node in air-to-ground communications to a plurality of fixed nodes, the system comprising:
a first position determination unit configured to determine a position of the mobile node;
a second position determination unit configured to determine ground position information for the plurality of fixed nodes;
a power amplifier configured to amplify a power of a communications signal from one or more communication devices;
an antenna coupled to the power amplifier, the antenna being configured to produce a radio frequency (RF) pattern when energized by the power amplifier; and
a power controller coupled to the power amplifier, wherein the power controller is configured to control the power level of the power amplifier according to the position of the mobile node, the ground position information of the plurality of fixed nodes, and the RF pattern.

2. The system of claim 1, wherein the power controller is further configured to determine the power level that will cause the RF pattern to excite the fewest number of the plurality of fixed nodes while still maintaining a stable connection with at least one of the plurality of fixed nodes.

3. The system of claim 1, wherein the mobile node is located in or upon a vehicle, and wherein the power controller is further configured to determine the power level according to a heading of the vehicle.

4. The system of claim 1, wherein the mobile node is located in or upon an aircraft, and wherein the power controller is further configured to determine the power level according to at least one of a pitch, roll, and yaw of the aircraft.

5. The system of claim 1, wherein the first position determination unit includes a Global Positioning System (GPS) unit.

6. The system of claim 3, wherein the first position determination unit includes an Inertial Navigation System (INS) which provides the heading to the power controller.

7. The system of claim 1, wherein the first position determination unit determines the position of the mobile node by detecting signals from one or more transmitters with known locations and determining the position of the mobile node from the known locations of the one or more transmitters from which the signals were detected.

8. The system of claim 1, wherein the second position determination unit is a database that stores the ground position information.

9. The system of claim 1, wherein the antenna is an exterior mounted antenna.

10. The system of claim 1, wherein the antenna includes multiple antennas arranged and phased as an array.

11. The system of claim 1, wherein the antenna is a steerable antenna.

12. The system of claim 11, wherein the power controller is further configured to determine the power level according to a gain achieved by steering the steerable antenna toward at least one of the plurality of fixed nodes.

13. The system of claim 1, wherein the first position determination unit, the second position determination unit, the power amplifier, the antenna, and the power controller are housed within or affixed upon an aircraft.

14. The system of claim 1, wherein the antenna is configured such that the RF pattern has a directional envelope that is substantially null directly underneath the antenna.

15. A method for controlling transmit power of a mobile node in air-to-ground communications to a plurality of fixed nodes, the mobile node including an antenna coupled to a power amplifier, the antenna being configured to produce a radio frequency (RF) pattern when energized by the power amplifier, the method comprising the steps of:
determining a position of the mobile node;

determining ground position information for the plurality of fixed nodes at a different location than the mobile node; and calculating a power level of the power amplifier utilizing the position of the mobile node, the ground position information of the plurality of fixed nodes, and the RF pattern.

16. The method of claim 15, wherein the calculating step further calculates the power level that will cause the RF pattern to excite the fewest number of the plurality of fixed nodes while still maintaining a stable connection with at least one of the plurality of fixed nodes.

17. The method of claim 15, wherein the mobile node is located in or upon a vehicle, and wherein the calculating step further calculates the power level according to a heading of the vehicle.

* * * * *